US012658397B2

(12) United States Patent (10) Patent No.: US 12,658,397 B2
Pantha et al. (45) Date of Patent: Jun. 16, 2026

(54) PHOTOCATHODE INCLUDING NANOSTRUCTURES FOR EXTENDED WAVELENGTHS

(71) Applicant: L3Harris Technologies, Inc., Melbourne, FL (US)

(72) Inventors: Bed Pantha, Chandler, AZ (US); Jacob J. Becker, Gilbert, AZ (US); Jon D. Burnsed, Tempe, AZ (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 609 days.

(21) Appl. No.: 17/992,736

(22) Filed: Nov. 22, 2022

(65) Prior Publication Data

US 2024/0170246 A1 May 23, 2024

(51) Int. Cl.
| | |
|---|---|
| *H01J 1/34* | (2006.01) |
| *B82Y 20/00* | (2011.01) |
| *G02B 23/12* | (2006.01) |
| *H01J 9/12* | (2006.01) |
| *H01J 31/50* | (2006.01) |

(52) U.S. Cl.
CPC ...... *H01J 1/34* (2013.01); *H01J 9/12* (2013.01); *B82Y 20/00* (2013.01); *G02B 23/12* (2013.01); *H01J 31/507* (2013.01); *H01J 2201/3423* (2013.01)

(58) Field of Classification Search
CPC ..................................... H01J 1/34; H01J 9/12
See application file for complete search history.

(56) References Cited

U.S. PATENT DOCUMENTS

| | | | |
|---|---|---|---|
| 3,958,143 | A | 5/1976 | Bell |
| 4,751,423 | A | 6/1988 | Munier et al. |
| 5,268,570 | A | 12/1993 | Kim |
| 5,610,078 | A | 3/1997 | Estrera et al. |
| 5,912,500 | A | 6/1999 | Costello et al. |
| 6,005,257 | A * | 12/1999 | Estrera .................... H01J 9/233 257/11 |
| 6,110,758 | A | 8/2000 | Estrera et al. |
| 6,558,973 | B2 | 5/2003 | Johnson et al. |
| 7,030,406 | B2 | 4/2006 | Edamura et al. |

(Continued)

FOREIGN PATENT DOCUMENTS

| | | |
|---|---|---|
| CN | 103903939 B | 7/2016 |
| CN | 109801820 A * | 5/2019 |

OTHER PUBLICATIONS

"Metamaterial photocathode for infrared image intensifier", Retrieved from https://techlinkcenter.org/technologies/metamaterial-photocathode-for-infrared-image-intensifier/7927eb70-db47-496a-92ed-7428b1f41a98, Retrieved on Sep. 30, 2022, 4 pages.

(Continued)

*Primary Examiner* — Chad M Dicke
*Assistant Examiner* — Dave Tan
(74) *Attorney, Agent, or Firm* — NIXON & VANDERHYE P.C.

(57) ABSTRACT

A photocathode. The photocathode includes an absorber. The absorber a p-type bulk active layer and a plurality of nanostructures formed on the p-type bulk active layer. The Photocathode further includes the plurality of nanostructures, such that the plurality of nanostructures are formed at a band bending region between the bulk active layer and the vacuum.

11 Claims, 6 Drawing Sheets

(56)                References Cited

U.S. PATENT DOCUMENTS

| | | | |
|---|---|---|---|
| 7,457,338 B2 | 11/2008 | Mawst et al. | |
| 9,768,339 B2 | 9/2017 | Yanka et al. | |
| 10,355,159 B2 | 7/2019 | Misra et al. | |
| 2002/0167254 A1* | 11/2002 | Craig ........................ | H01J 1/34 |
| | | | 313/103 R |
| 2021/0234063 A1* | 7/2021 | Maros .................. | H10H 20/812 |
| 2021/0366972 A1* | 11/2021 | Costello ................ | H01J 29/861 |

OTHER PUBLICATIONS

Escher et al., "Photoelectric imaging in the 0.9-1.6 micron range", IEEE Electron Device Letters, vol. 2, Issue 5, May 1981, 123 -125.
Estrera et al., "Development of extended red (1.0- to 1.3-μm) image intensifiers", SPIE's 1995 International Symposium on Optical Science, Engineering, and Instrumentation, 1995, vol. 2551.
Guo et al., "Near-infrared photocathode In0.53Ga0.47As doped with zinc: A first principle study", Optik, vol. 127, Issue 3, Feb. 2016, pp. 1268-1271.
Guo et al., "Theoretical study on electronic and optical properties of In0.53Ga0.47As (1 0 0) ß2 (2 × 4) surface", Applied Surface Science, vol. 288, Jan. 1, 2014, pp. 238-243.
Miller et al., "EMCORE four-junction inverted metamorphic solar cell development", AIP Conference Proceedings, vol. 1616, 2014, 5 Pages.
Muchun et al., "Photoemission behaviors of transmission-mode InGaAs photocathode", Proceedings of the SPIE, vol. 9270, 2014, 6 Pages.
Sachno et al., "Image intensifier tube (I2) with 1.06-μm InGaAs-photocathode", 18th International Conference on Photoelectronics and Night Vision Devices and Quantum Informatics, 2004, vol. 5834, 7 Pages.
Xu et al., "Numerical simulation study on quantum efficiency characteristics of InP/InGaAs/InP infrared photocathode" International Symposium on Optoelectronic Technology and Application, 2016, vol. 10157, 8 Pages.
Yang et al., "Spectral response of InGaAs photocathodes with different emission layers", Applied Optics vol. 55, Issue 31, pp. 8732-8737, 2016.
Zhenhui et al., "Simulation of InP/In0.53Ga0.47As/InP infrared photocathode with high quantum yield", Infrared and Laser Engineering, 2019, 7 Pages.
European Search Report received for EP Patent Application No. 23208066.3, mailed on Apr. 5, 2024, 11 pages.

* cited by examiner

Nightvision System 100

122

Housing 124

Objective 102

Figure 5:
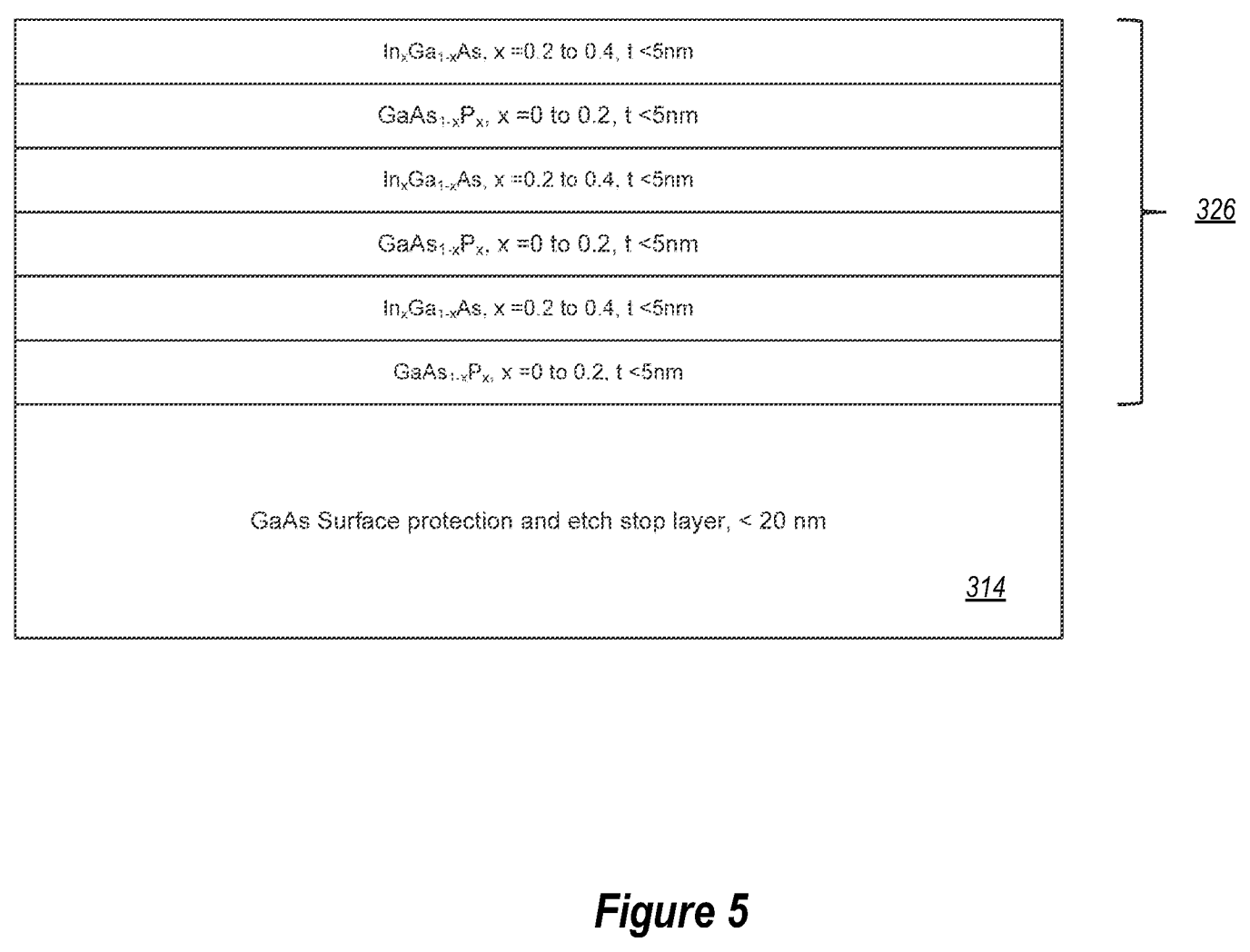

326

$In_xGa_{1-x}As$, x =0.2 to 0.4, t <5nm $GaAs_{1-x}P_x$, x =0 to 0.2, t <5nm $In_xGa_{1-x}As$, x =0.2 to 0.4, t <5nm $GaAs_{1-x}P_x$, x =0 to 0.2, t <5nm $In_xGa_{1-x}As$, x =0.2 to 0.4, t <5nm $GaAs_{1-x}P_x$, x =0 to 0.2, t <5nm

GaAs Surface protection and etch stop layer, < 20 nm

PHOTOCATHODE INCLUDING NANOSTRUCTURES FOR EXTENDED WAVELENGTHS

BACKGROUND

Background and Relevant Art

Nightvision systems allow a user to see in low-light environments without external human visible illumination. This allows for covert vision in a low-light environment to prevent flooding the environment with human visible light.

Some nightvision systems function by receiving low levels of light reflected off of, or emitted from objects and providing that light to an image intensifier (sometimes referred to as I²). The image intensifier has a photocathode. When photons strike the photocathode, electrons are emitted into a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic, to an eyepiece where the user can directly view the illuminated phosphor screen, thus allowing the user to see the objects.

Spectral response from the state-of-the-art Gen III (GaAs) photocathodes cuts off at around 900 nm. In particular, these state-of-the-art systems have been implemented using photocathodes formed using ternary materials (e.g., InGaAs) formed on binary substrates (e.g., GaAs). This results in lattice mismatches, which causes strain, resulting in reduced imaging performance that corresponds to the longer wavelength sensitivity and which places practical limits on photocathode wavelength ranges described above.

This may be satisfactory for implementing devices configured to observe objects that would normally be visible to humans in lighted conditions. However, this spectrum cutoff may be unsuitable for other uses. For example, it may be useful to have a device that functions with wavelengths up to a 1550 nm. This wavelength is particularly useful as it is a commonly used wavelength suitable for high-power, eyesafe lasers for manufacturing long-range rangefinders and/or laser guidance and laser painting systems. Thus, if a user desires to have a traditional nightvision system that also allows for viewing certain laser-based systems, this may not be possible with current technology. To the extent that current systems are able to function up to 1550 nm, those systems are generally manufactured using inferior manufacturing techniques which may reduce sensitivity overall, or at least portions of, the usable spectrum.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a photocathode. The photocathode includes an absorber. The absorber a p-type bulk active layer and a plurality of nanostructures formed on the p-type bulk active layer. The Photocathode is exposed to a vacuum, coupling the plurality of nanostructures with the vacuum forming a band bending region between the bulk active layer and the vacuum.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 illustrates multiple quantum wells and an etch stop layer;

DETAILED DESCRIPTION

Figure 6:
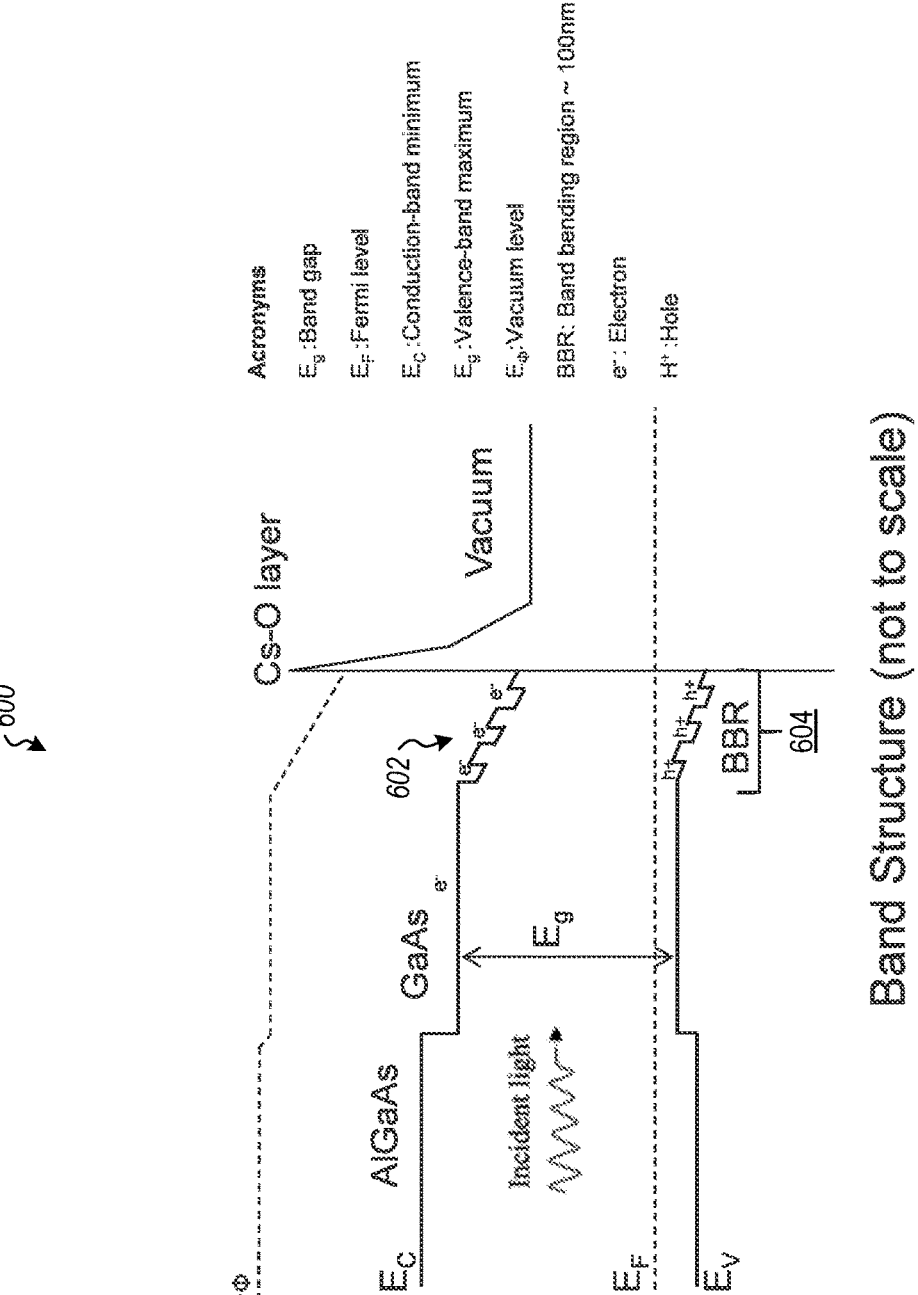
FIG. 6 illustrates a band structure diagram.

Embodiments illustrated herein implement photocathode absorbers that are engineered to have a band gap to absorb long wavelength photons. This is accomplished by incorporating nanostructures, such as quantum wells (QWs) or quantum dots, in a bent band region. As will be discussed in more detail below, an example of this is illustrated in FIG. 6, where nanostructures 602 are included in a band bending region 604 of a band structure 600 of a photocathode. In particular, the nanostructures 602 are fabricated such that they are, or will be exposed to a vacuum (which may be implemented as a vacuum tube).

Previously a GaInAs absorber of a photocathode on a GaAs substrate is limited in wavelength sensitivity range due to significant performance reduction as the range extends much beyond 900 nm. However, including nanostructures as illustrated herein, achieves functionality with longer wavelengths by decreasing the bandgap of the portion of the absorber of the photocathode. In particular, embodiments can vary a bandgap of the material from about 1.4 to 0.7 eV at 300 Kelvin allowing for extended spectrum as compared to previous photocathode designs. Note that while it is desirable to achieve a low bandgap, it may be desirable to not have the bandgap be below some predetermined lower threshold. In particular, embodiments illustrated below implement Cs—O activation that may not function correctly below certain threshold bandgaps. As noted below, in some embodiments, this lower bandgap threshold can be enforced by forming a thin (e.g., 5 nm GaAs—) layer on the active layer and forming the Cs—O layer on the thin GaAs or layer.

Such processing is advantageous in that it may reduce Equivalent Background Illumination (EBI) and increases Quantum Efficiency (QE). In some embodiments, this is used to tailor bandgap and photocathode composition to meet particular specifications. For example, some embodiments are implemented having spectrum sensitivity between 1064 nm to 1200 nm. Other embodiments have even longer wavelength sensitivity.

Figure 1:
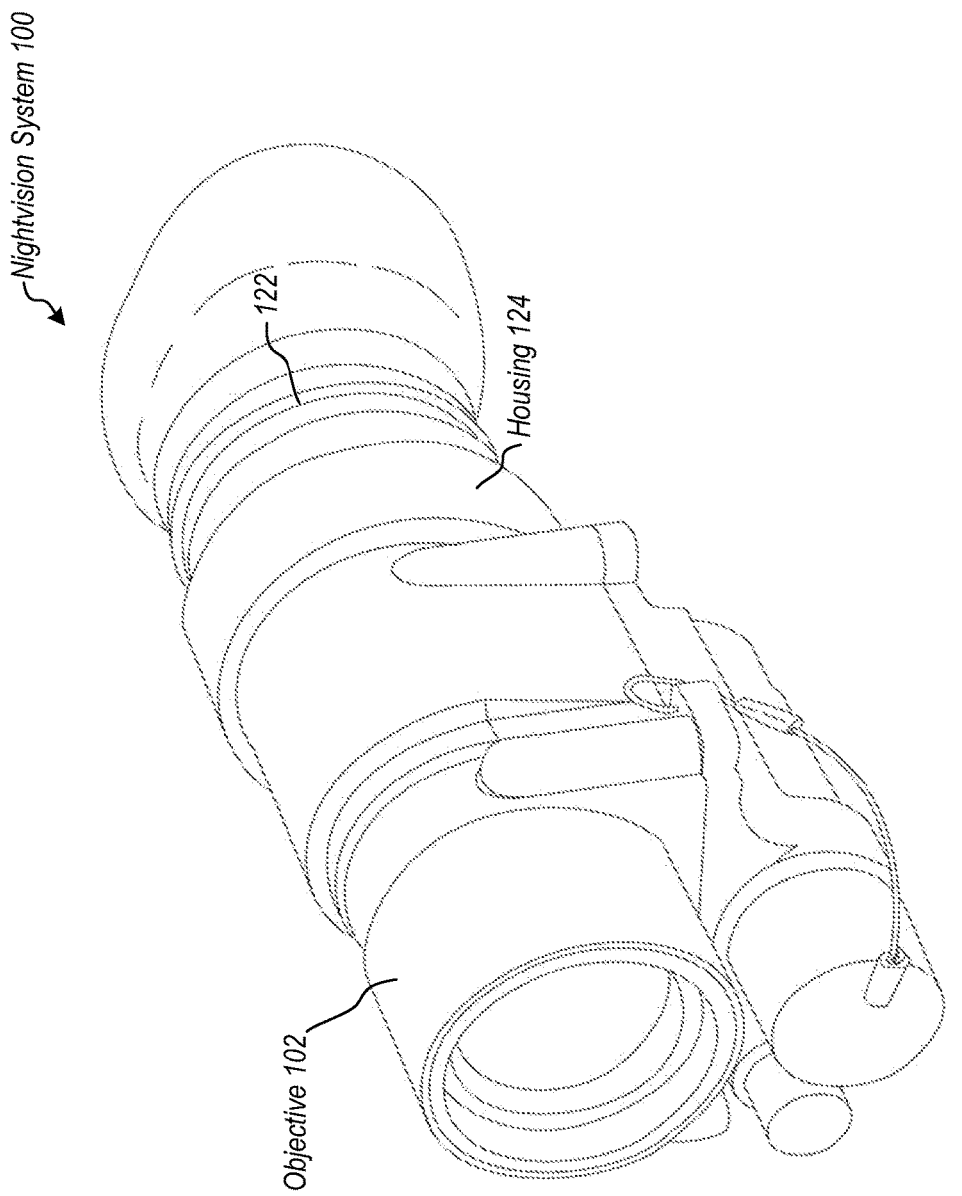
FIG. 1 illustrates an example nightvision system.

Additional details are illustrated. Attention is now directed to FIG. 1, where a specific example of a nightvision system is illustrated. In particular, FIG. 1 illustrates the PVS—14 nightvision system 100. In the example illustrated, the nightvision system 100 includes a housing 124. As will be illustrated in more detail below in other figures, the housing 124 houses an image intensifier and various other components. The nightvision system 100 further includes an objective 102 which receives weak light reflected and/or generated in an environment. The objective 102 includes optics such as lenses, waveguides, and/or other optical components for receiving and transmitting light to an image intensifier, discussed in more detail below. The nightvision system 100 further includes an eyepiece 122. The eyepiece 122 includes optics for directing images created by the nightvision system 100, including images created by an image intensifier and images created by a transparent optical device, into the eye of the user.

Figure 2:
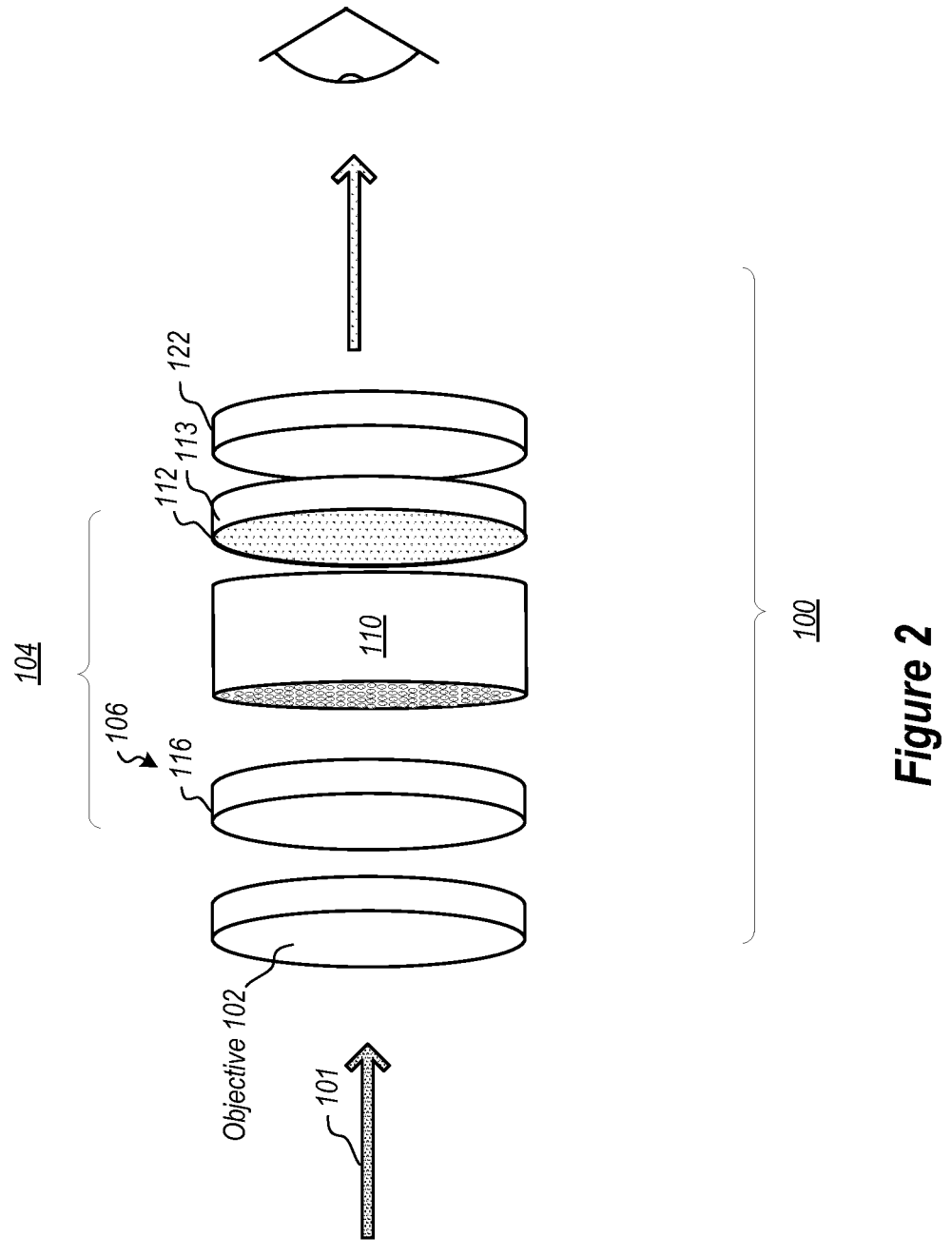
FIG. 2 illustrates a block diagram of portions of a nightvision system.

Attention is now directed to FIG. 2. FIG. 2 illustrates a block diagram of one embodiment of the invention. A nightvision system typically includes an objective 102 to focus input light 101 into an image intensifier 104. Input light 101 may be, for example, from ambient sources, such as light from heavenly bodies such as stars, the moon, or even faint light from the setting sun. Additionally, or alternatively, ambient sources could include light from buildings, automobiles, or other faint sources of light that cause reflection of light from an object being viewed in a nightvision environment into the objective. A second source of light may be light being emitted from an external source towards an object, reflected off the object, and into the objective. For example, the source may be an infrared source that is not viewable in the viewable spectrum for human observers. For example, in some embodiments, laser guidance and painting systems may direct laser light at objects for designation and/or targeting. A third source of light may be light emitted by an object itself. For example, this may be related to visible light, infrared heat energy emitted by the object and directed into the objective, etc. Nonetheless, the nightvision system is able to convert the light emitted from the source into a viewable image for the user.

The objective directs input light 101 into the image intensifier 104. Note that the image intensifier 104 may include functionality for amplifying light received from the objective to create a sufficiently strong image that can be viewed by the user. This may be accomplished using various technologies. In the example of FIG. 2, a photocathode 106, a microchannel plate 110, and a phosphor screen 112 are used. The space between the absorber 116 and the phosphor screen, including the microchannel plate 110, includes a vacuum. The photocathode 106 generates photo electrons in response to incoming photons. Electrons from the photocathode 106 are emitted into the microchannel plate 110. Electrons are multiplied in the microchannel plate 110.

Electrons are emitted from the microchannel plate 110 to a phosphor screen 112 which glows as a result of electrons striking the phosphor screen 112. This creates a monochrome image from the input light 101.

A fiber-optic 113 carries this image as intensified light to the eyepiece (such as eyepiece 122 illustrated in FIG. 1 of a nightvision system where it can be output to the user. This fiber-optic 113 can be twisted 180 degrees to undo the inversion caused by the system objective to allow for convenient direct viewing of the phosphor screen 112.

Figure 3:
FIG. 3 illustrates an nanostructured photocathode.
Figure 3:
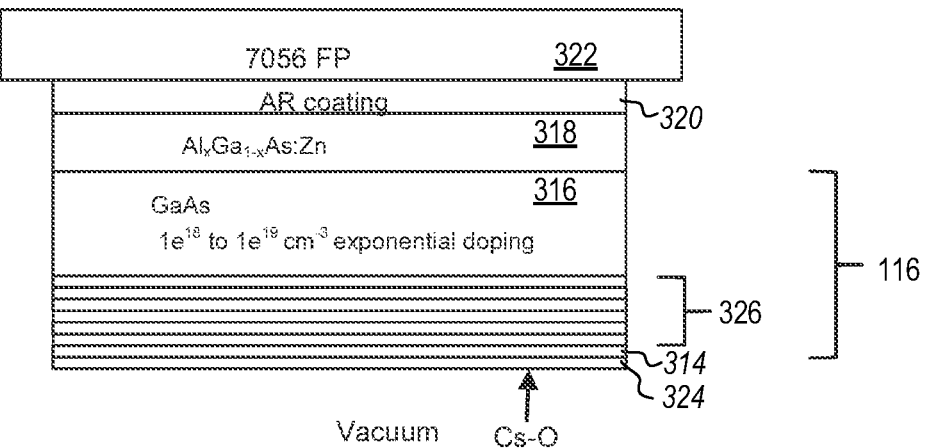

Embodiments may be implemented with an improved photocathode such as, for example, photocathode 106 illustrated in FIG. 3. An improved photocathode may be manufactured to be sensitive to a broader spectrum of light as compared to previous GaAs designs.

In the example illustrated in FIG. 3, nanostructure layers 326 are included in the absorber 116. The nanostructure layers 326 can vary the bandgap of the absorber 116 from 1.4 to 0.7 eV at 300 Kelvin. A detailed example of nanostructure layers 326 is illustrated in FIG. 5. Note that while five nanostructure layers are illustrated, it should be appreciated that in other embodiments, other numbers of nanostructure layers are included. In particular, acceptable results can be achieved with as few as 2 to 5 nanostructure layers, although more can be included in other embodiments.

Note that the nanostructures 602 (see FIG. 6), formed in the nanostructure layers, are exposed to a vacuum to cause the nanostructures 602 to be in the band bending region 604. The thickness and barrier height of the nanostructures 602 are implemented such that electrons can tunnel through the quantum barrier. Note further that the total thickness of all of the nanostructures is less than the thickness of the band bending region, which in the illustrated example, is approximately 50 to 100 nm and will vary depending on the doping within the active region.

Note that various different types of nano structures may be implemented. For example, InGaAs/GaAs and/or InGaAsN/GaAsN quantum wells may be implemented in the band bending region 604. Photoluminescence emission may be targeted to >1100 nm. In this example there is a strong enough electric field to extract electrons from quantum wells to the surface-vacuum interface. Further, with a specialized etch process of GaAs (to clean the surface before loading the cathodes to the Cs-activation chamber) one can control the thickness in nanometer scale which would allow for terminating the surface-vacuum interface with a thin GaAs layer (e.g., less than 5 nm), as illustrated in FIG. 3 by the fully strained layer 314. This way the activation will be same as that in the state-of-the-art Gen III cathodes currently being implemented, yet electrons will tunnel through the thin GaAs layer. The following now illustrates a number of different designs.

In one embodiment, InGaAs/GaAsP quantum wells are implemented. In this example, a III-V multi-quantum well (MQW) design is implemented. This results in a photocathode having an absorption wavelength of 1 um to 1.2 um at 300K. In some such embodiments, an Indium composition in InGaAs layers of the nanostructure layers varies between 0.1 to 0.4. In some such embodiments, the Phosphorus composition in GaAsP layers of the nanostructure layers varies between 0 to 0.2. The GaAsP layers in the produce nanostructure layers tensile strain, while the InGaAs nanostructure layers produce compressive strain. MQWs can be fully strain-compensated or fully strained or partially strain-compensated. The strain in a given layer is the lattice constant delta between the layers X thickness. The critical thickness is the thickness at which onset of strain relaxation starts.

In an alternative example, dilute nitride MQWs are implemented. In this example, photocathodes are designed to have an absorption wavelength of 1.2 um to 1.55 um. The Indium composition in $In_x Ga_{1-x} As_{1-y} N_y Sb_z$ layers of the nanostructure layers varies between, x=0.3 to 0.5, y=0.01 to 0.05, z=~0.05. The Nitrogen composition in $GaAs_{1-y} N_y$ layers of the nanostructure layers varies between y=0.005 to 0.03. The GaAsN layers of the nanostructure layers produce tensile strain. The InGaAsNSb layers of the nanostructure layers produce compressive strain. MQWs can be fully strain-compensated or fully strained or partially strain-compensated. The strain in a given layer is equal to the lattice constant delta between the layers times the thickness. A critical thickness occurs where onset of strain relaxation starts.

Note that the bandgap can be fine-tuned to optimize tradeoffs between photo-response, spectral response range, and EBI. Note that using the nanostructures, bandgap for the absorber can be tuned to support 900 nm to at least 1550 nm wavelengths.

Figure 4:
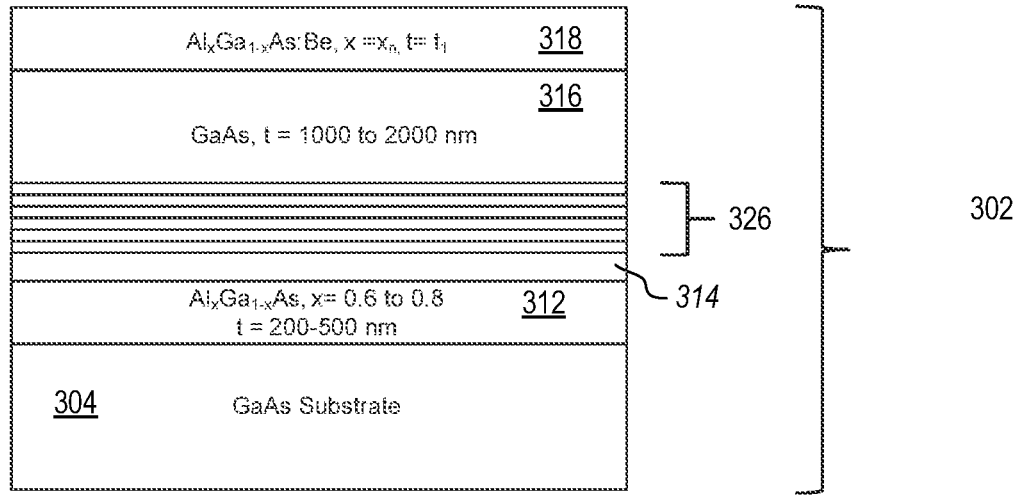
FIG. 4 illustrates a epitaxial structure for forming an nanostructured photocathode.

FIG. 4 illustrates an epitaxial structure used to form the photocathode 106. In particular, FIG. 4 illustrates an epitaxial structure 302 used to manufacture the photocathode 106. FIG. 4 illustrates that a substrate 304 (which in this example is GaAs) is used. For example, a commercially available GaAs wafer may be obtained and the other layers of the epitaxial structure 302 may be formed on the GaAs wafer. Note that other substrates may be used in other examples.

FIG. 4 illustrates an etch stop layer 312 formed on substrate 304. Etch stop layer 312, in this example, is an AlGaAs etch stop layer. Note that the etch stop layer 312 can use any suitable etch stop material. For example, in some embodiments, the etch stop layer may be In(Al)GaP or InAlAs. In forming the photocathode 106, the substrate 304 will be selectively removed by predetermined wet chemistries followed by removing this etch stop layer 312 with different wet chemistries. Using chemistries used in phosphide etch stop processes is advantageous with respect to reducing or eliminating etch residues left on surface by other etch chemistries. Further, such chemistries will not partially etch the active layers of the epitaxial structure 302, including the nanostructure layers 326 and the active layer 316. Having phosphide etch stop layers allows for exceptionally selective chemistries between the two different types of materials (Arsenide and Phosphide). Therefore, the atomic layers at the surface of active layers will retain their epitaxial quality. High surface quality includes characteristics such as being free of etch residues and having no added surface roughness due to an etch stop removal process. Therefore, the etch stop layer 312 is used to create a damage free or pristine surface of the absorber or the layer on which Cs—O monolayers (e.g., activation layer 324) (see FIG. 3) are deposited (where deposition of such layers is known as an activation process) in ultra-high vacuum conditions. Activation in a pristine surface will minimize the losses of photogenerated electrons arriving at the surface by interface trap states and hence will reduce Equivalent Background Illumination (EBI). The etch stop layer 312 may have, for example, a nominal thickness of about 200 nm, although FIG. 4 illustrates that the thickness may range from 2000 nm to 5000 nm. FIG. 4 further illustrates a fully strained layer 314 (which in this example, is GaAs, but will be a different material if a different substrate is used). In some embodiments, the fully strained layer 314 serves as a substrate for forming the active layers including the nanostructure layers 326 and the active layer 316. The thickness of this fully strained layer 314 is typically less than 20 nm, most of which is etched away during surface preparation for the Cs—O activation layer 324 illustrated in FIG. 3. If any of this layer remains in the photocathode 106, being a higher bandgap of GaAs (with respect to the band gap of the active layers including the nanostructure layers 326 and the active layer 316), this fully strained layer 314 acts as a barrier for thermally generated electrons but freely passes energetic photogenerated electrons (in the active layer 316) through a quantum tunneling process on their way to the vacuum. Thus, this is another approach to minimize the EBI. In such case, Cs—O is deposited on this fully strained layer 314 (if it remains), as illustrated by the Cs—O activation layer 324. Since this fully strained layer 314 is thin (typically ~5 nm), if it remains in the photocathode 106, the etch stop layer 312 is selected in such a way that etch chemistries should be highly selective. The etch stop layer (312) can be selected so that process control can be realistically achieved.

FIG. 4 illustrates the nanostructure layers 326, the active layer 316 and a window layer 318. The active layer 316 of the photocathode is a bulk layer having been fabricated to instill certain properties in the active layer 316. Such properties may be, for example, optical properties allowing for detection of certain optical wavelengths. That is, a target band gap is selected, and an appropriate amount of various materials are included to achieve the target band gap. In some embodiments, P-type doping is achieved by incorporating Zinc (Zn) atoms or beryllium (Be) during epitaxial forming processes via chemical vapor deposition process using a Be precursor. In some embodiments, Be doping is used instead of Zn doping particularly when the active layer 316 is processed using MBE.

The doping in the active layer 316 is designed in some embodiments, in such a way that it creates a linear internal electric field across the active layer 316 thickness. Be doping is exponentially increased as the thickness of active layer 316 increases, such that highest doping occurs at an interface to the window layer 318 with doping increasing away from an interface between the active layer 316 and the nanostructure layers 326. A typical doping range is $10^8$ to $10^{19}$ atoms per cubic centimeter. In some embodiment, the doping range can be designed from $1 \times 10^{17}$ to $5 \times 10^{19}$ atoms per cubic centimeter range. The internal electric field will accelerate the photogenerated electrons toward the vacuum thereby increasing the quantum efficiency of the photocathode 106. For example, in some embodiments, the composition of In, Ga, and N is chosen such that it creates a photocathode that is sensitive to light which includes 1064 nm wavelengths. This may be useful in 1064 nm laser applications. These lasers can be used for medical purposes to remove lesions and tumors. Alternatively, these lasers can be used for cutting and/or etching. These lasers can be used for flow visualizations. These lasers can be used for laser rangefinders and/or laser guidance and laser painting systems.

In some embodiments, rather than exponential doping, the doping is such that it satisfies bent band region thickness requirements. In the illustrated example, such doping would be selected to be in the range of $1 \times 10^{18}$ to $5 \times 10^{18}$ atoms per cubic centimeter, with lower doping at the surface-vacuum interface.

Alternatively or additionally, embodiments may implement the active layer 316 having a near infrared spectrum of 900-1700 nm. This spectrum can be useful for laser range finders and designators as well as observation and detection of celestial bodies.

Alternatively or additionally, embodiments may implement the active layer 316 having a spectrum of 1.7 to 3 um. This is one spectrum that has been referred to as short wave infrared. Note that this is a useful spectrum and represents the limit of systems that can use glass optics as glass optics become non-functional above 3 um.

Unlike photodiodes (which are PN junction devices), transmission mode photocathodes, such as the active layer 316 include only p-type bulk layers.

The active layer 316 may be formed via any practicable growth, deposition, or/and other process.

FIG. 4 further illustrates the window layer 318. A window layer 318 is a doped protective layer that protects the active layer 316. In particular, the window layer 318 provides passivation to prevent corrosion of the active layer 316 and this layer also provides and energy barrier to electrons preventing photogenerated electrons from diffusing away from the vacuum surface and recombining at the opposite side of the active layer. The window layer 318 is doped such that it has a large band gap so as to not absorb light that is intended to reach the active layer 316. In some embodiments, the window layer 318 may be designed so as to reduce reflectivity of the active layer 316 to allow for more light to be absorbed by the active layer 316 than if a more reflective surface were present on the active layer 316. In some embodiments the window layer may be $In_{0.48} Ga_{0.52}P$ or InAlP or AlInGaP lattice matched to GaAs. A phosphide window can provide better passivation than arsenide window layer.

Returning once again to FIG. 3, various finishing elements are illustrated. In particular, FIG. 3 illustrates that that an antireflective coating 320 is added over the window layer 318. A faceplate 322 is bonded to the photocathode. The faceplate 322, in this example is Corning 7056 glass. FIG. 3 further illustrates complete removal of the substrate 304. This may be performed by etching, grinding, and/or other processes.

FIG. 3 illustrates that a Cs—O activation layer 324 may be added to create a negative electron affinity (NEA) surface. In an alternative embodiment, $Cs_2Te$ or CsF ($CsNF_3$ instead of Cs—O) may be used in place of Cs—O. Thus, in some embodiments, one or a few monolayers of Cs or Cs—O are deposited on a barrier layer or a GaAs layer to lower the vacuum level below the GaAs conduction band.

In some embodiments, the optional fully strained layer 314 may be added for better Cs—O activation and for electrons to tunnel though. In some embodiments, the optional fully strained layer is thinner than 5 nm. This thin fully strained layer acts as 1) a barrier for thermally generated electrons but passes energetic photogenerated electrons toward the vacuum via a quantum tunneling process; and 2) leverage to use known surface cleaning and activation processes to make a negative electron affinity (NEA) cathode. This fully strained layer is completely strained and sufficiently thin. Sufficiently thin means that photogenerated electrons can tunnel through this layer.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
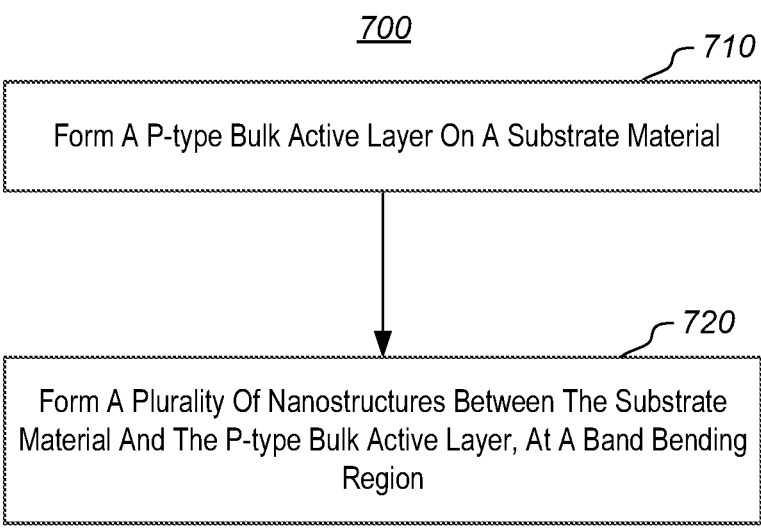
FIG. 7 illustrates a method of forming a photocathode.

Referring now to FIG. 7, a method 700 is illustrated. The method 700 includes acts for forming a photocathode. The method 700 includes forming a p-type bulk active layer on a substrate material (act 710). For example, FIG. 4 illustrates the active layer 316 formed on the substrate 304.

The method 700 further includes forming a plurality of nanostructures between the substrate material and the p-type bulk active layer, at a band bending region (act 720). For example, FIG. 4 illustrates forming the nanostructure layers 326 between the substrate 304 and the active layer 316.

The method 700 may be practiced where forming a plurality of nanostructures between the substrate material and the p-type bulk active layer comprises forming 2 to 5 nanostructure layers. Note that the example illustrated in FIGS. 3, 4, and 5 illustrate five nanostructure layers.

The method 700 may be practiced where forming a plurality of nanostructures between the substrate material and the p-type bulk active layer comprises forming quantum wells.

The method 700 may be practiced where forming a plurality of nanostructures between the substrate material and the p-type bulk active layer comprises forming quantum dots.

The method 700 may be practiced where forming a plurality of nanostructures between the substrate material and the p-type bulk active layer comprises forming one or more InGaAsNSb layers and one or more GaAsN layers.

The method 700 may be practiced where forming a plurality of nanostructures between the substrate material and the p-type bulk active layer comprises forming one or more InGaAs layers and one or more GaAsP layers.

The method 700 may further include removing the substrate material and forming a Cs based activation layer on the nanostructures. FIG. 3 illustrates that the substrate 304 is removed and the activation layer 324 is formed on the nanostructures of the nanostructure layers 326.

The method 700 may further include removing the substrate material and exposing the nanostructures to a vacuum. FIG. 3 illustrates an example of this where the nanostructure layers 326 are proximate the vacuum.

The method 700 may be practiced where forming a p-type bulk active layer comprises doping the p-type bulk active layer exponentially doped by p-type impurities with levels of doping increasing away from an interface between the p-type bulk active layer and the substrate material.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A photocathode epitaxial structure comprising:
a substrate material;
a p-type bulk active layer formed on the substrate material; and
a plurality of nanostructures formed between the substrate material and the p-type bulk active layer, positioned within a band bending region,
wherein the plurality of nanostructures comprise quantum-confined nanostructures including at least one of quantum wells or quantum dots, and wherein a total thickness of the plurality of nanostructures is less than a thickness of the band bending region.

2. The photocathode epitaxial structure of claim 1, wherein the plurality of nanostructures formed between the substrate material and the p-type bulk active layer comprises 2 to 5 nanostructure layers.

3. The photocathode epitaxial structure of claim 1, wherein the quantum wells comprise the plurality of nano-structures positioned within the band bending region.

4. The photocathode epitaxial structure of claim 1, wherein the quantum dots comprise the plurality of nano-structures positioned within the band bending region.

5. The photocathode epitaxial structure of claim 1, wherein the plurality of nanostructures formed between the substrate material and the p-type bulk active layer comprises one or more InGaAsNSb layers and one or more GaAsN layers.

6. The photocathode epitaxial structure of claim 1, wherein the plurality of nanostructures formed between the substrate material and the p-type bulk active layer comprises one or more InGaAs layers and one or more GaAsP layers.

7. The photocathode epitaxial structure of claim 1, further comprising an InGaP etch stop layer to prevent surface damage.

8. The photocathode epitaxial structure of claim 1, further comprising a window layer formed on the p-type bulk active layer.

9. The photocathode epitaxial structure of claim 1, wherein the p-type bulk active layer is doped exponentially by p-type impurities with levels of doping increasing away from an interface between the p-type bulk active layer and the substrate material.

10. A photocathode comprising:

an absorber, the absorber comprising:

a p-type bulk active layer; and a plurality of nanostructures formed on the p-type bulk active layer; and wherein the plurality of nanostructures are exposed to a vacuum and are located within a band bending region between the bulk active layer and the vacuum, wherein the plurality of nanostructures are formed between a substrate material and the p-type bulk active layer in an epitaxial structure, and wherein, the plurality of nanostructures are proximate the vacuum.

11. The photocathode of claim 10, wherein the plurality of nanostructures comprise at least one of quantum wells or quantum dots located within the band bending region between the bulk active layer and the vacuum.

* * * * *